(12) United States Patent
Mikami

(10) Patent No.: US 9,681,383 B2
(45) Date of Patent: Jun. 13, 2017

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Fumio Mikami, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 14/570,950

(22) Filed: Dec. 15, 2014

(65) Prior Publication Data

US 2015/0173020 A1 Jun. 18, 2015

(30) Foreign Application Priority Data

Dec. 18, 2013 (JP) .................................. 2013-260812

(51) Int. Cl.

| | |
|---|---|
| *H01Q 11/12* | (2006.01) |
| *H04W 52/02* | (2009.01) |
| *H04B 5/00* | (2006.01) |
| *H02J 17/00* | (2006.01) |

(52) U.S. Cl.
CPC ......... *H04W 52/0235* (2013.01); *H02J 17/00* (2013.01); *H04B 5/0031* (2013.01); *H04B 5/0037* (2013.01); *Y02B 60/50* (2013.01)

(58) Field of Classification Search
CPC ..... H04W 12/06; H04W 4/008; H04W 88/02; H04W 12/08; H04W 4/02; H04W 68/00; H04W 68/005; H04W 92/18; H04W 4/005; H04W 4/023; H04W 4/16; H04W 52/0254; H04W 8/005; H04W 4/001; H04W 4/003; H04W 4/021
USPC ...................................................... 455/127.1
See application file for complete search history.

(56) References Cited

U.S. PATENT DOCUMENTS

2012/0302166 A1* 11/2012 Yamaoka ................ H04W 8/22
455/41.1
2014/0323053 A1* 10/2014 Yamaoka .......... H04W 52/0229
455/41.2

FOREIGN PATENT DOCUMENTS

JP 2012-100307 A 5/2012

* cited by examiner

*Primary Examiner* — Ajibola Akinyemi
(74) *Attorney, Agent, or Firm* — Canon U.S.A., Inc. IP Division

(57) ABSTRACT

An information processing apparatus operable in a first power state and in a second power state in which power consumption is lower than that in the first power state includes a near-field wireless communication unit configured to be driven by electric power induced by a radio wave from a mobile terminal, and communicate with the mobile terminal when the information processing apparatus is in the second power state. The near-field wireless communication unit sends, if a command received from the mobile terminal in the second power state is a command of a first type, a response corresponding to the command to the mobile terminal in the second power state, and if the received command is a command of a second type, performs control so as to supply electric power to a portion necessary for sending a response corresponding to the command to the mobile terminal.

9 Claims, 7 Drawing Sheets

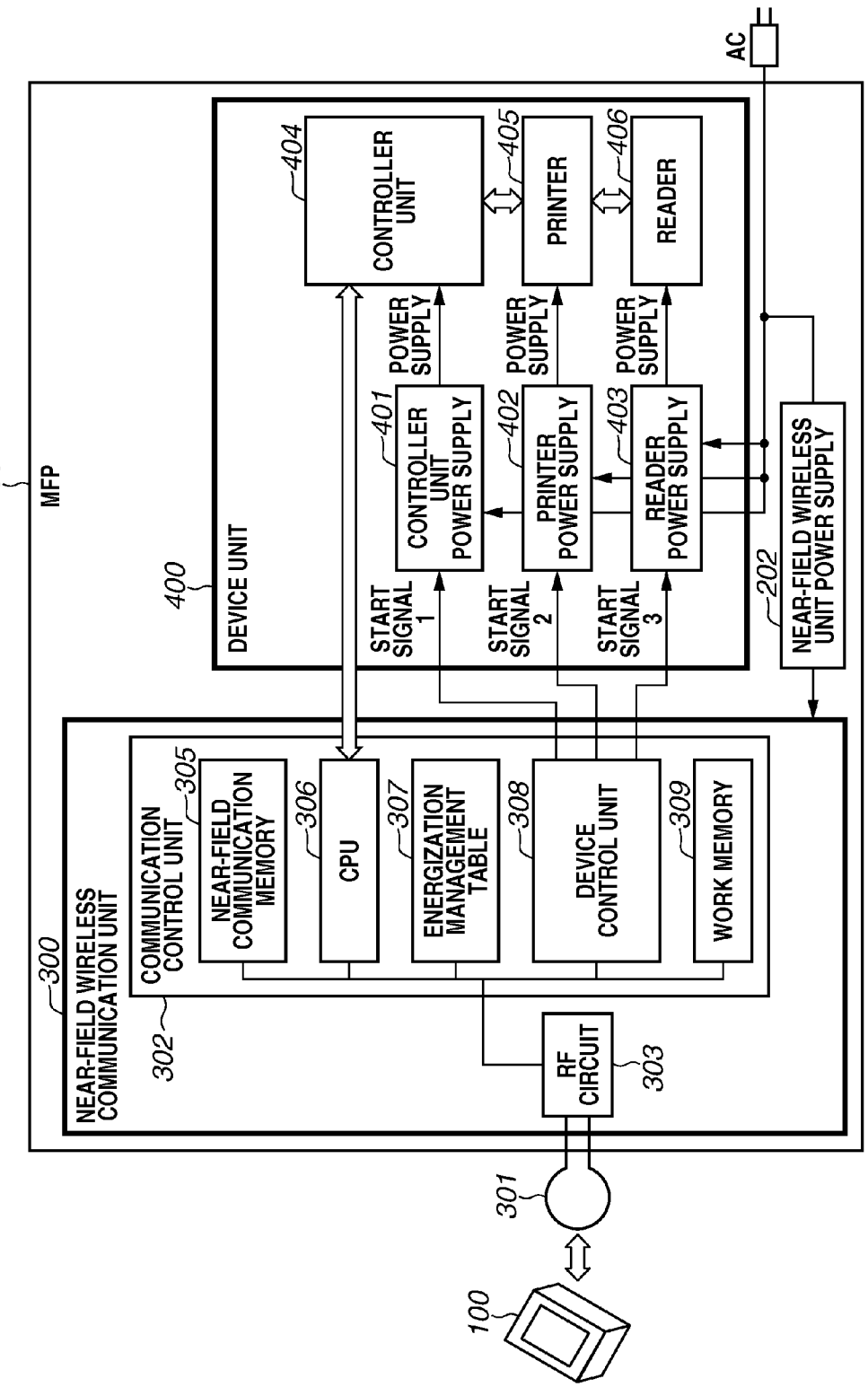

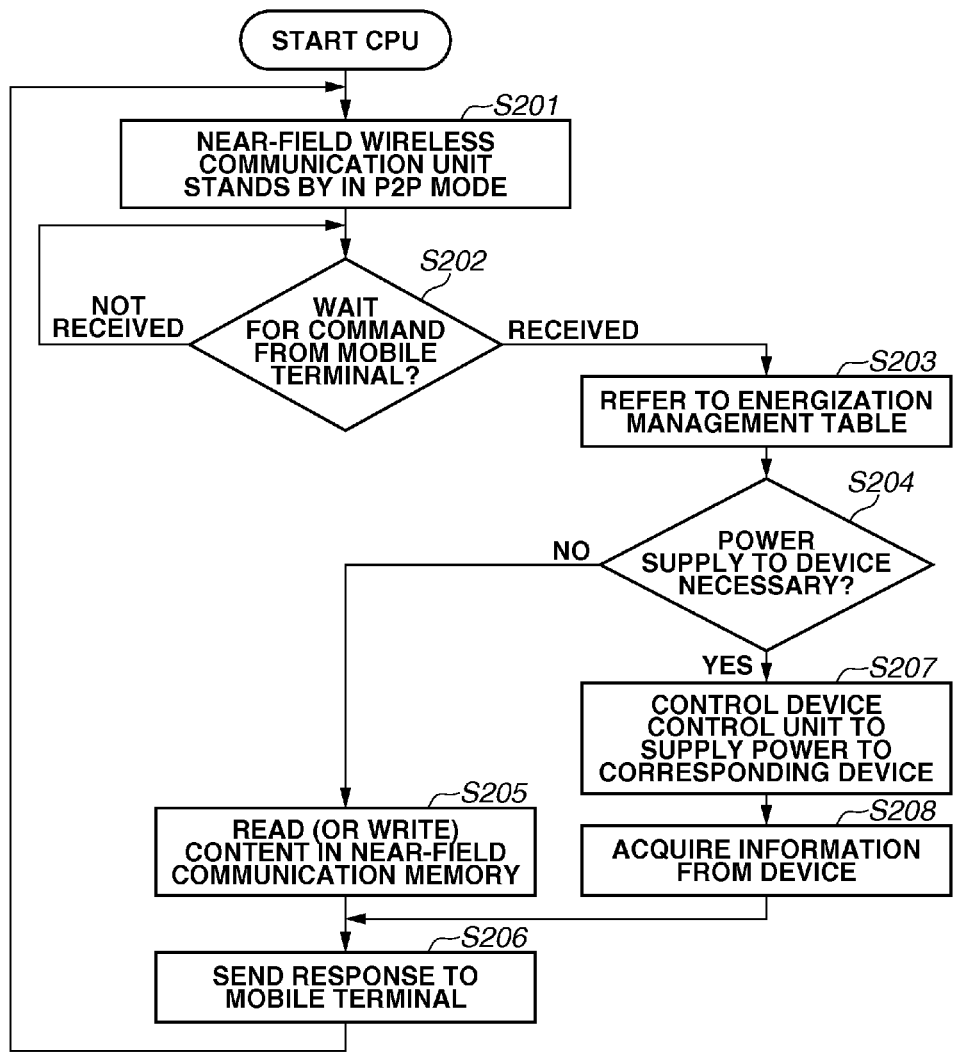

FIG.3

ENERGIZATION MANAGEMENT TABLE

| REQUEST DATA | DEVICE TO BE STARTED |
|---|---|
| NETWORK SETTING VALUE | ACQUIRE FROM NEAR-FIELD COMMUNICATION MEMORY |
| ADDRESS BOOK | ACQUIRE FROM NEAR-FIELD COMMUNICATION MEMORY |
| DESTINATION COUNTRY | ACQUIRE FROM NEAR-FIELD COMMUNICATION MEMORY |
| PRINTER LOG | START CONTROLLER UNIT AND PRINTER |
| PRINTER PROCESS VALUE | START CONTROLLER UNIT AND PRINTER |
| READER LOG | START CONTROLLER UNIT AND READER |
| READER SENSOR CORRECTION VALUE | START CONTROLLER UNIT AND READER |

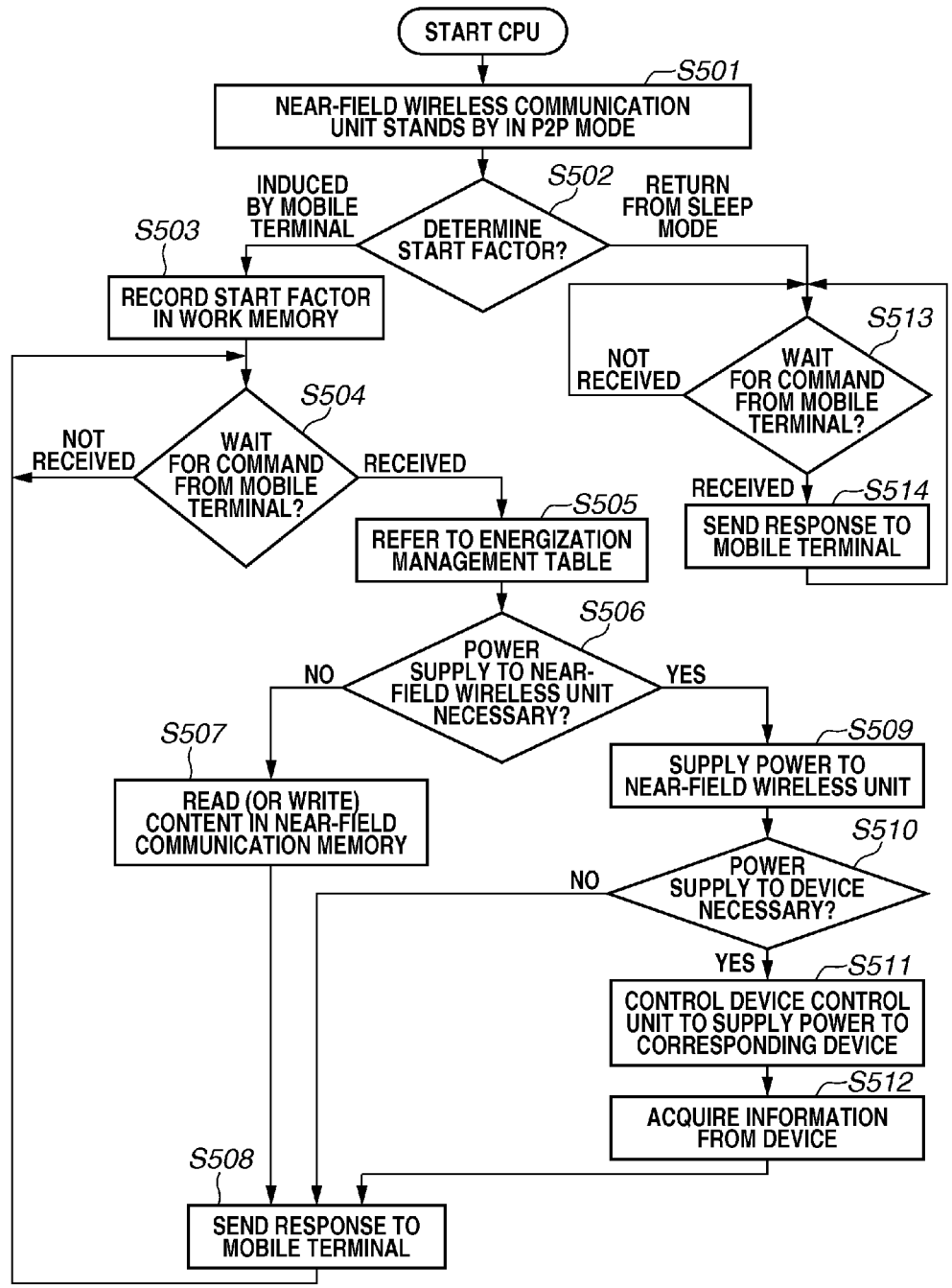

FIG.6

ENERGIZATION MANAGEMENT TABLE

| REQUEST DATA | DEVICE TO BE STARTED |
|---|---|
| NETWORK SETTING VALUE | ACQUIRE FROM NEAR-FIELD COMMUNICATION MEMORY |
| ADDRESS BOOK | ACQUIRE FROM NEAR-FIELD COMMUNICATION MEMORY |
| DESTINATION COUNTRY | ACQUIRE FROM NEAR-FIELD COMMUNICATION MEMORY |
| PRINTER LOG | START NEAR-FIELD WIRELESS COMMUNICATION UNIT, CONTROLLER UNIT, AND PRINTER |
| PRINTER PROCESS VALUE | START NEAR-FIELD WIRELESS COMMUNICATION UNIT, CONTROLLER UNIT, AND PRINTER |
| READER LOG | START NEAR-FIELD WIRELESS COMMUNICATION UNIT, CONTROLLER UNIT, AND READER |
| READER SENSOR CORRECTION VALUE | START NEAR-FIELD WIRELESS COMMUNICATION UNIT, CONTROLLER UNIT, AND READER |

INFORMATION PROCESSING APPARATUS, METHOD FOR CONTROLLING INFORMATION PROCESSING APPARATUS, AND STORAGE MEDIUM

BACKGROUND

Field

Aspects of the present invention generally relate to control of an information processing apparatus having a near-field wireless communication unit.

Description of the Related Art

To set user data and service data to an image forming apparatus such as a multi function peripheral (MFP), or to read the data from the image forming apparatus, conventionally, it has been always necessary to turn on the image forming apparatus and establish communication between the image forming apparatus and a device such as a personal computer.

Japanese Patent Application Laid-Open No. 2012-100307 proposes a technique for accessing a memory for near-field communication by power supply from a system when the system is in operation, and accessing the memory for near-field communication by communication radio waves from an external reader and writer device when the system is not in operation.

When the image forming apparatus having a near-field wireless communication unit exchanges information according to the communication from the external reader and writer device, the information can be categorized into two types: information that can be exchanged without energization of the image forming apparatus body, and information that cannot be exchanged without energization of the image forming apparatus body. In the technique proposed in Japanese Patent Application Laid-Open No. 2012-100307, in exchanging the information that cannot be exchanged without energization of the image forming apparatus body, an operator is required to determine whether to energize the MFP to perform the exchange of the information. The determination of whether to energize the image forming apparatus body depending on such attributes of information is left to the operator, which is very bothersome, and may cause mis-operation.

To avoid the above-described mis-operation, when the image forming apparatus communicates with the external reader and writer device, it is expected that, as a standard operation, the image forming apparatus is always turned on to perform the communication. The method of always turning on the image forming apparatus, however, may cause inefficient operations, and unnecessary power consumption.

SUMMARY

Aspects of the present invention are generally directed to a technique for, when setting or acquiring information to or from an information processing apparatus using near-field wireless communication, enhancing convenience of an operator and power saving capability by eliminating the need for operator's determination of whether to energize an apparatus body, and preventing unnecessary power consumption caused by unnecessary startup of the apparatus body due to mis-operation.

According to an aspect of the present invention, an information processing apparatus operable in a first power state and in a second power state in which power consumption is lower than that in the first power state, includes a near-field wireless communication unit configured to be driven by electric power induced by a radio wave from a mobile terminal and communicate with the mobile terminal when the information processing apparatus is in the second power state. In a case where a command received from the mobile terminal when the information processing apparatus is in the second power state is a command of a first type, the near-field wireless communication unit sends a response corresponding to the command to the mobile terminal in the second power state, and in a case where the command received from the mobile terminal when the information processing apparatus is in the second power state is a command of a second type, performs control so as to supply electric power to a portion necessary for sending a response corresponding to the command to the mobile terminal.

Further features of the present disclosure will become apparent from the following description of exemplary embodiments with reference to the attached drawings.

BRIEF DESCRIPTION OF THE DRAWINGS

FIG. 1 illustrates an example of an information processing apparatus according to a first exemplary embodiment.

FIG. 2 is a flowchart illustrating an example of an operation performed at a near-field wireless communication unit side according to the first exemplary embodiment.

FIG. 3 illustrates an example of an energization management table according to the first exemplary embodiment.

FIG. 5 is a flowchart illustrating an example of an operation performed at a near-field wireless communication unit side according to the second exemplary embodiment.

FIG. 6 illustrates an example of an energization management table according to the second exemplary embodiment.

DESCRIPTION OF THE EMBODIMENTS

Figure 4:
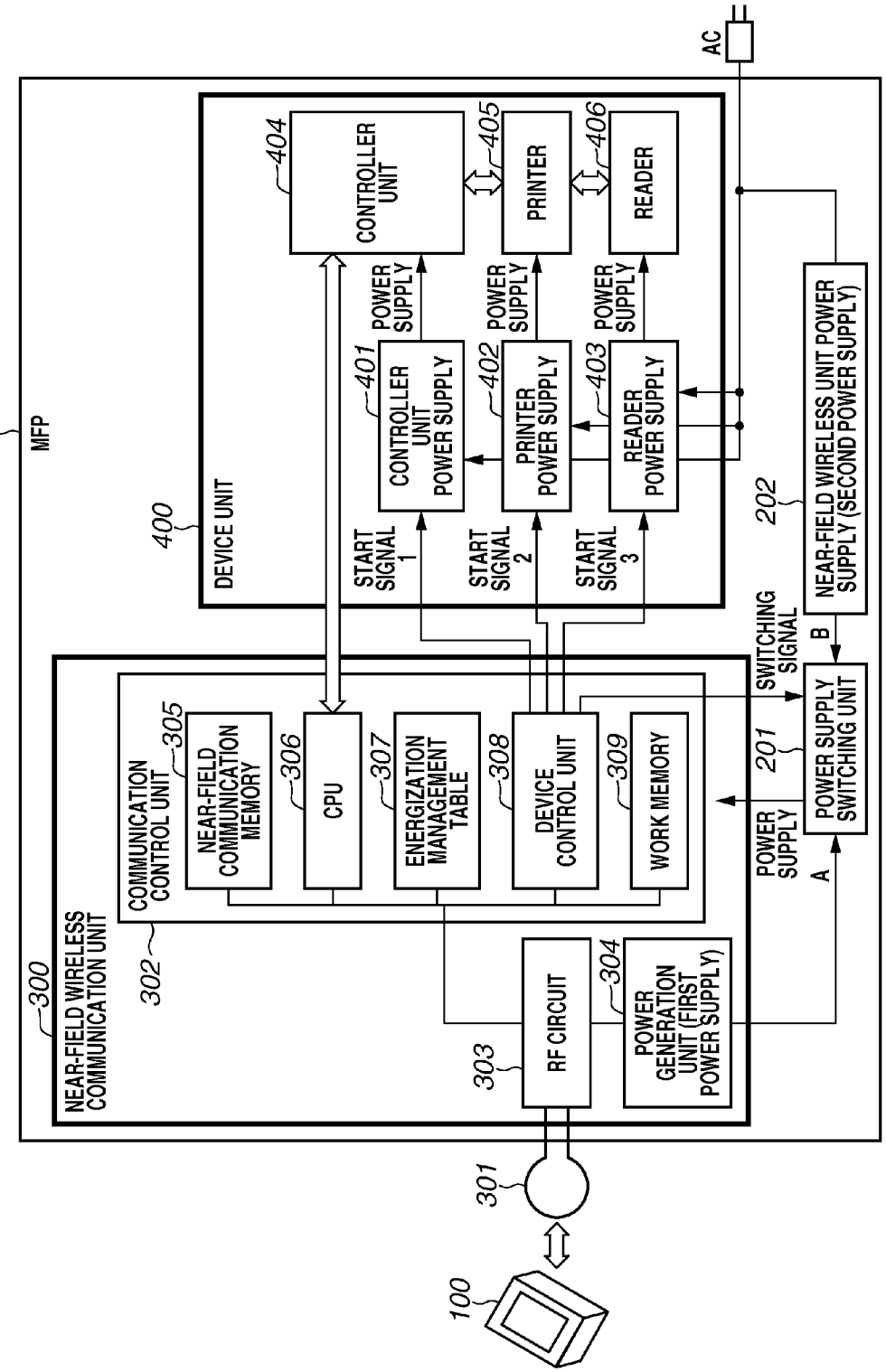
FIG. 4 illustrates an example of an information processing apparatus according to a second exemplary embodiment.

Various exemplary embodiments, features, and aspects will be described in detail below with reference to the drawings.

FIG. 1 is a block diagram illustrating an example of an information processing apparatus according to a first exemplary embodiment.

In FIG. 1, an image forming apparatus (hereinafter, referred to as multi function peripheral (MFP)) 200 serves as the information processing apparatus according to the first exemplary embodiment. The information processing apparatus according to an exemplary embodiment is not limited to the MFP, and alternatively, other information processing apparatuses such as a printer and a scanner may be used.

The MFP 200 has a plurality of functions such as a printer, scanner, copying machine, and facsimile machine. The MFP 200 includes a near-field wireless communication unit 300, a device unit 400, and a near-field wireless unit power supply 202. A mobile terminal 100 is an external device that can perform near-field wireless communication with the near-field wireless communication unit 300 of the MFP 200. The near-field wireless unit power supply 202 functions as a power generation unit that supplies electric power from an external alternating-current (AC) power supply to the near-field wireless communication unit 300.

The near-field wireless communication unit 300 employs near field communication (NFC). The mobile terminal 100 includes an NFC interface, and using the NFC interface, communicates with the near-field wireless communication unit 300.

The near-field wireless communication unit 300 will be described below.

The near-field wireless communication unit 300 includes an NFC communication antenna (hereinafter, referred to as an antenna) 301. A radio frequency (RF) circuit 303 is a high frequency circuit for NFC communication. A communication control unit 302 communicates with the mobile terminal 100 near the antenna 301. The communication control unit 302 also communicates with a controller unit 404 of the device unit 400.

A near-field communication memory 305 is a nonvolatile memory. In the near-field communication memory 305, information including network setting values, address book data, and destination country information is stored. The near-field wireless communication unit 300 further includes a central processing unit (CPU) 306. The CPU 306 operates by reading a program stored in a read-only memory (ROM) (not illustrated) included in the CPU 306. An energization management table 307 such as the one illustrated in FIG. 3, which will be described below, is written in a nonvolatile memory in advance. A device control unit 308 controls power supply output of the device unit 400 according to output signals (start signals 1 to 3). The near-field wireless communication unit 300 further includes a work memory 309.

Next, the device unit 400 will be described.

The device unit 400 includes the controller unit 404 of the MFP 200. The device unit 400 further includes a printer unit 405 and a reader unit 406.

The controller unit 404 is a CPU board having a CPU, a ROM, a random access memory (RAM), a hard disk drive (HDD), and various interfaces for connecting with the near-field wireless communication unit 300, the printer unit 405, the reader unit 406, and a network interface (I/F) (not illustrated) or an operation unit (not illustrated). The controller unit 404 performs overall control of the MFP 200 by the internal CPU executing a program stored in the ROM, the HDD, or the like.

A power supply unit (a controller unit power supply) 401 for the controller unit 404 supplies non-all-night electric power to the controller unit 404 according to the start signal 1. A power supply unit (a printer power supply) 402 for the printer unit 405 supplies electric power to the printer unit 405 according to the start signal 2. A power supply unit (a reader power supply) 403 for the reader unit 406 supplies electric power to the reader unit 406 according to the start signal 3.

Hereinafter, power states of the MFP 200 will be described.

The MFP 200 operates while switching its state between a standby state and a sleep state (a power saving state), in which less power is consumed as compared to the standby state.

In the sleep state, the near-field wireless unit power supply 202 supplies electric power to the near-field wireless communication unit 300. Non-all-night electric power supply by the power supply units 401, 402, and 403 is stopped, and the power supply units 401-403 stand ready to output non-all-night electric power in response to input of the start signals 1, 2, and 3, respectively.

The power supply unit 401 includes a non-all-night electric power supply unit that supplies the above-described non-all-night electric power, and an all-night electric power supply unit that supplies all-night electric power. The all-night electric power supply unit of the power supply unit 401 operates even in the sleep state, and supplies all-night electric power to the controller unit 404. In the sleep state, the controller unit 404 operates by the all-night electric power to monitor occurrence of a sleep return factor.

The sleep return factor includes, for example, input of a sleep release button (not illustrated), and job reception via a network interface (not illustrated). When the controller unit 404 detects an occurrence of a sleep return factor, the controller unit 404 notifies the CPU 306 that the MFP 200 has returned from the sleep state.

In the standby state, both of the near-field wireless communication unit 300 and the device unit 400 are energized. In the standby state, the non-all-night electric power supply unit of the power supply unit 401 supplies non-all-night electric power to the controller unit 404. In a power-off state, both of the near-field wireless communication unit 300 and the device unit 400 are not energized. When electric power is supplied to the near-field wireless communication unit 300, the CPU 306 is started, and reads a program ROM (not illustrated) in the CPU 306 to start the operation.

Referring to FIG. 2, an operation of the CPU 306 according to the first exemplary embodiment will be described below.

FIG. 2 is a flowchart illustrating an example of the operation of the CPU 306 according to the first exemplary embodiment. The processing performed in the flowchart is implemented by the CPU 306 reading and executing a program stored in the ROM included in the CPU 306.

At the MFP 200 side, when the CPU 306 is started, in step S201, the near-field wireless communication unit 300 is in the standby state in a peer to peer (P2P) mode. In step S202, the CPU 306 waits for reception of a command from the mobile terminal 100.

When a user performs setting to the MFP 200 from the mobile terminal 100 (or acquires information from the MFP 200), the user starts a predetermined application in the mobile terminal 100. Through this operation, the NFC of the mobile terminal 100 enters the P2P mode. In this state, the user instructs an operation, and holds the mobile terminal 100 over the antenna 301 of the MFP 200. This enables the mobile terminal 100 and the near-field wireless communication unit 300 to communicate with each other. The processing at the mobile terminal 100 side will be described below with reference to FIG. 7.

When the CPU 306 determines that a command from the mobile terminal 100 is received ("RECEIVED" in step S202), in step S203, the CPU 306 refers to the energization management table 307 (exemplified in FIG. 3) stored in the nonvolatile memory. Referring to FIG. 3, the energization management table will be described.

FIG. 3 illustrates an example of the energization management table according to the first exemplary embodiment.

As illustrated in FIG. 3, the energization management table according to the first exemplary embodiment, in which each request data (each command) received from the mobile terminal 100 is associated with a device (module (portion)) of the MFP 200 that is to be energized and started, stores and manages the data and devices. The energization management table in FIG. 3 is only an example, and an exemplary embodiment is not limited to this example. The CPU 306 refers to such an energization management table according to a command received from the mobile terminal 100 to determine whether to energize each portion of the MFP 200. As a result, control of supplying electric power to the portion determined to be energized can be performed.

The description will return back to the flowchart in FIG. 2.

Next, in step S204, the CPU 306 determines whether power supply to the device unit 400 is necessary, based on the command received from the mobile terminal 100 and the energization management table.

A case of "performing network setting to the MFP in the sleep state" will be described as an example.

When the CPU 306 receives a command requesting setting of a network setting value, the CPU 306 determines that it is not necessary to supply electric power to the device unit 400, based on the energization management table. When the request for setting a network setting value is received, only a reading/writing operation to the nonvolatile near-field communication memory 305 is performed. In step S204, when the CPU 306 determines that power supply to the device unit 400 is not necessary (NO in step S204), the processing proceeds to step S205.

In step S205, according to the command received from the mobile terminal 100, the CPU 306 reads information in the nonvolatile near-field communication memory 305, or writes the information in the nonvolatile near-field communication memory 305. For example, when the CPU 306 receives the command requesting setting of a network setting value, in step S205, the CPU 306 writes the network setting value received from the mobile terminal 100 in the nonvolatile near-field communication memory 305.

When the reading processing (or the writing processing) in step S205 ends, in step S206, as a response to the received command, the CPU 306 sends the read data (or the completion of the writing operation) to the mobile terminal 100, and the processing returns to step S201.

The information written in the near-field communication memory 305 while the MFP 200 is in the sleep mode, such as, for example, a network setting value, address book data, and destination country information, is stored in a storage device in the controller unit 404 when the MFP 200 returns to the standby mode. Through this operation, the setting performed from the mobile terminal 100 while the MFP 200 is in the sleep state is reflected in the MFP 200 body. If a setting value such as, for example, a network setting value, address book data, and destination country information is changed while the MFP 200 is in the standby state, the change is reflected in the near-field communication memory 305 at least by the time the MFP 200 enters the sleep mode.

A case of "acquiring a printer log in the sleep state" will be described as an example.

When the CPU 306 receives a command for acquiring a printer log from the mobile terminal 100, the CPU 306 determines, based on the energization management table, that it is necessary to supply electric power to the controller unit 404 and the printer unit 405 to acquire the printer log. In step S204, when the CPU 306 determines that power supply to the device unit 400 is necessary (YES in step S204), the processing proceeds to step S207.

In step S207, the CPU 306 instructs the device control unit 308 to start the device described in the energization management table as a device to be started. In the case of "acquiring a printer log in the sleep state", the CPU 306 instructs the device control unit 308 to output the start signals 1 and 2 for starting the power supply units 401 and 402, respectively. Through this operation, the controller unit 404 and the printer unit 405 are started.

When the controller unit 404 is started, in step S208, the CPU 306 instructs the controller unit 404 to acquire the printer log. In response to the instruction, the controller unit 404 communicates with the printer unit 405, acquires the log of the operation (the printer log), and sends the acquired printer log to the CPU 306. When the processing in step S208 ends, in step S206, as a response to the received command, the CPU 306 sends the acquired data to the mobile terminal 100, and the processing returns to step S201.

As described above, in the case of exchanging a small amount of data that can be stored in the near-field communication memory 305 in the near-field wireless communication unit 300 in the MFP 200, the data exchange can be performed by communication with the external reader and writer device, without starting the device unit 400 of the MFP 200. The processing that can be performed by this method includes, for example, a network setting, an address book reading/writing setting, reading processing of a counter of the number of printed sheets, a destination write setting, and a user mode write setting.

Meanwhile, in the case of the data (for example, various kinds of real-time data such as logs and temperatures, and image formation process data for maintenance) that cannot be stored in the near-field communication memory 305 in the near-field wireless communication unit 300, a corresponding module (portion) in the MFP 200 is started, and the data is acquired. If the MFP 200 cannot be started in response to the instruction to start the MFP 200, there is a possibility that the MFP 200 has broken, so the CPU 306 notifies the mobile terminal 100 of the information.

Figure 7:
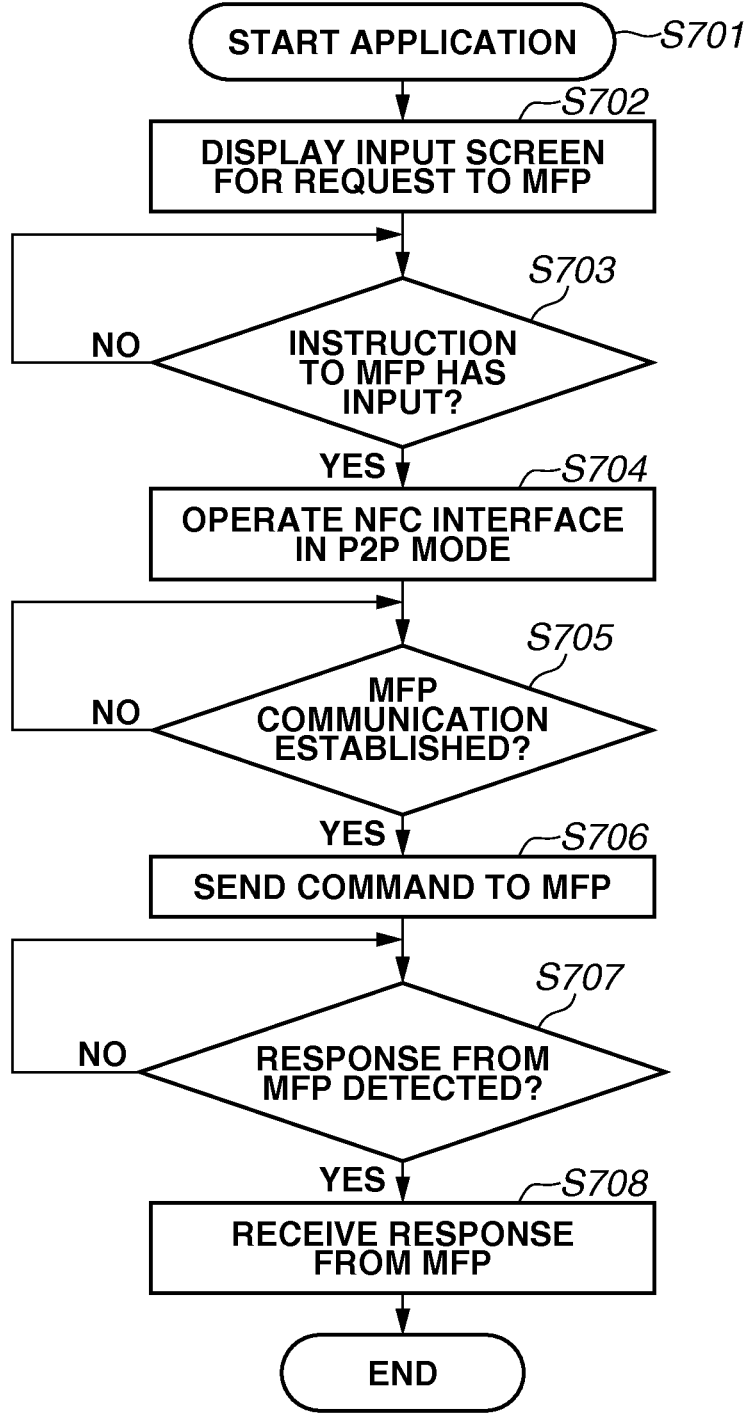
FIG. 7 is a flowchart illustrating an example of an operation performed at a mobile terminal side.

Referring to FIG. 7, the processing at the mobile terminal 100 side will be described.

FIG. 7 is a flowchart illustrating an example of the processing at the mobile terminal 100 side. The processing is implemented by a CPU (not illustrated) of the mobile terminal 100 reading and executing a program stored in a ROM (not illustrated), or the like.

In step S701, when the CPU (not illustrated) of the mobile terminal 100 detects an application start instruction for performing setting to the MFP 200 by a user, the CPU starts the application. The program of the application is stored in, for example, the ROM (not illustrated) of the mobile terminal 100.

Next, in step S702, the CPU of the mobile terminal 100 displays an input screen for inputting a request to the MFP 200. In step S703, the CPU waits for input of an instruction to the MFP 200 by the user. If the CPU determines that an instruction to the MFP 200 by the user has been input (YES in step S703), in step S704, the CPU of the mobile terminal 100 operates the NFC interface in the P2P mode.

Next, in step S705, the CPU of the mobile terminal 100 waits for establishment of communication with the MFP 200. If the CPU of the mobile terminal 100 determines that communication with the MFP 200 has been established (YES in step S705), the processing proceeds to step S706.

In step S706, the CPU of the mobile terminal 100 sends, to the MFP 200, a command corresponding to the instruction to the MFP 200 input by the user. Then, in step S707, the CPU of the mobile terminal 100 waits for a response from the MFP 200. If the CPU of the mobile terminal 100 detects a response from the MFP 200 (YES in step S707), in step S708, the CPU receives the response from the MFP 200, and ends the processing of the flowchart.

The processing time from steps S706 to S708 may vary depending on the command sent from the mobile terminal 100 to the MFP 200. That is, when the device unit 400 of the MFP 200 is started to acquire the information from the device unit 400, the processing time becomes long, whereas, when the information is acquired from the MFP 200 without starting the device unit 400 of the MFP 200, the processing time becomes short.

Depending on the data to be acquired from the image forming apparatus or to be set using the near-field wireless communication, there are a case where the image forming apparatus body needs to be started, and a case where the image forming apparatus body does not need to be started. In the present exemplary embodiment, the near-field wireless communication unit 300 has a table corresponding to commands, and determines whether to energize the MFP 200 body (for example, the device unit 400), and if the MFP 200 body is to be energized, the near-field wireless communication unit 300 determines which device is to be energized. According to the present exemplary embodiment, an operator can acquire necessary information from or set necessary information to the image forming apparatus only by operating the mobile terminal and holding the mobile terminal over the image forming apparatus which is in the power-saving state called a sleep state. During this operation, the operator can perform the acquisition and setting of the necessary information by automatically starting the image forming apparatus body only when it is necessary to start the image forming apparatus body, or perform the acquisition and the setting of the necessary information while keeping the power-saving state without starting the image forming apparatus body when it is not necessary to start the image forming apparatus body. This can prevent unnecessary power consumption caused by unnecessary startup of the image forming apparatus body due to misoperation of the operator. Further, the operator has only to instruct an operation using the near-field wireless communication, which can enhance convenience of the operator.

In the above-described first exemplary embodiment, the description has been given of the configuration in which the near-field wireless communication unit 300 is driven by the electric power based on an external power supply in both of the standby state and the sleep state. In a second exemplary embodiment, in the standby state, the near-field wireless communication unit 300 is driven by the electric power based on an external power supply, and in the sleep state, the near-field wireless communication unit 300 is driven by the electric power induced by radio waves from the mobile terminal 100. Hereinafter, the second exemplary embodiment will be described in detail. In the second exemplary embodiment, description of components similar to those in the first exemplary embodiment will be omitted, and only different components will be described.

FIG. 4 is a block diagram illustrating an example of an information processing apparatus according to the second exemplary embodiment. Components similar to those in FIG. 1 are assigned the same reference numerals.

In FIG. 4, a power supply switching unit 201 switches between electric power (B input) generated from AC by the near-field wireless unit power supply (a second power supply) 202 and electric power (A input) induced by the antenna 301 so as to supply power to the near-field wireless communication unit 300. The power supply switching unit 201 switches between the power supply sources (A input and B input) and selects either, according to a switching signal from the device control unit 308. A power generation unit (a first power supply) 304 generates direct-current (DC) power (A input) from electric power induced at the antenna 301.

In the standby state, in the power supply switching unit 201, the B input is selected as the power supply source, and the electric power (B input) from the near-field wireless unit power supply 202 is supplied to the near-field wireless communication unit 300. When the MFP 200 shifts to the sleep state, under control from the controller unit 404, or the like, the power supply switching unit 201 switches the power supply source from the B input to the A input. That is, in the sleep state, the power supply switching unit 201 selects the power supply source so that the A input is used as the power supply source to the near-field wireless communication unit 300. Consequently, in the sleep state, the near-field wireless communication unit 300 operates by the electric power induced to the antenna 301 from the mobile terminal 100, which is performing a reader/writer operation.

When the MFP 200 is in the sleep state, the non-all-night electric power supply unit of the power supply unit 401, the power supply units 402 and 403, and the near-field wireless unit power supply 202 are stopped, whereas the AC is supplied, so the units stand ready to be able to output the electric power in response to the respective start signals. While the MFP 200 is in the sleep state, the all-night electric power supply unit of the power supply unit 401 operates, and the controller unit 404 monitors occurrence of a sleep return factor.

When the controller unit 404 detects occurrence of a sleep return factor, the controller unit 404 outputs a start signal (not illustrated) to the near-field wireless unit power supply 202 to operate the near-field wireless unit power supply 202, and switches the power supply source of the power supply switching unit 201 from the A input to the B input. When the electric power is supplied to the near-field wireless communication unit 300, the CPU 306 is started, and reads a program ROM (not illustrated) in the CPU and starts the operation.

Referring to FIG. 5, the operation of the CPU 306 according to the second exemplary embodiment will be described.

FIG. 5 is a flowchart illustrating an example of the operation of the CPU 306 according to the second exemplary embodiment. The processing performed in the flowchart is implemented by the CPU 306 reading and executing a program stored in the ROM included in the CPU 306.

At the MFP 200 side, when the CPU 306 is started, in step S501, the near-field wireless communication unit 300 is in the standby state in the P2P mode. In step S502, the CPU 306 determines a start factor of the CPU 306. The CPU 306 can determine the start factor by a notification from the controller unit 404. When a sleep return notification is sent from the controller unit 404, the CPU 306 determines that the start factor is "sleep return", and when the sleep return notification is not sent, the CPU 306 determines that the start factor is "induction from the mobile terminal".

When the CPU 306 determines that the start factor of the CPU 306 is induction from the mobile terminal 100 ("INDUCED BY MOBILE TERMINAL" in step S502), the processing proceeds to step S503. In step S503, the CPU 306 records, in the work memory 309, a flag indicating the start by the induction from the mobile terminal, and the processing proceeds to step S504. In step S504, the CPU 306 waits for a command from the mobile terminal 100.

When the user performs setting to the MFP 200 from the mobile terminal 100 (or acquires information), the user starts a predetermined application. Through this operation, the NFC of the mobile terminal 100 enters the P2P mode. In this state, the user instructs an operation, and holds the mobile terminal 100 over the antenna 301 of the MFP 200. This enables the mobile terminal 100 and the near-field wireless communication unit 300 to communicate with each other. The processing at the mobile terminal 100 side has been described with reference to FIG. 7.

When the CPU 306 determines that a command from the mobile terminal 100 is received ("RECEIVED" in step S504), in step S505, the CPU 306 refers to an energization management table 307 stored in a nonvolatile memory. In the second exemplary embodiment, the energization management table 307 such as the one illustrated in FIG. 6 is written in the nonvolatile memory in advance. Referring to FIG. 6, the energization management table according to the second exemplary embodiment will be described.

FIG. 6 illustrates an example of the energization management table according to the second exemplary embodiment.

As illustrated in FIG. 6, similar to the energization management table according to the first exemplary embodiment, the energization management table according to the second exemplary embodiment stores and manages devices of the MFP 200 that is to be started, for each request data received from the mobile terminal 100. In the second exemplary embodiment, when acquisition of a printer log, a printer process value, a reader log, and a reader sensor correction value, for example, is to be performed, the devices to be started include the near-field wireless communication unit 300. The energization management table in FIG. 6 is only an example, and an exemplary embodiment is not limited to this example.

The description will return back to the flowchart in FIG. 5.

Next, in step S506, the CPU 306 determines, based on the command received from the mobile terminal 100 and the energization management table, whether power supply to the near-field wireless communication unit 300 is necessary.

A case of "performing network setting to the MFP in the sleep state" will be described as an example.

When the CPU 306 receives a command requesting setting of a network setting value, the CPU 306 determines that it is not necessary to supply electric power to the near-field wireless communication unit 300, based on the energization management table. When the request for setting a network setting value is to be performed, only a reading/writing operation to the nonvolatile near-field communication memory 305 is performed. In step S506, when the CPU 306 determines that power supply to the near-field wireless communication unit 300 is not necessary (NO in step S506), the processing proceeds to step S507.

In step S507, according to the command received from the mobile terminal 100, the CPU 306 reads the information in the nonvolatile near-field communication memory 305, or writes the information in the nonvolatile near-field communication memory 305. For example, when the CPU 306 receives the command requesting setting of a network setting value, in step S507, the CPU 306 writes the network setting value received from the mobile terminal 100 in the nonvolatile near-field communication memory 305.

When the reading processing (or the writing processing) in step S507 ends, in step S508, as a response to the received command, the CPU 306 sends the read data (or the completion of the writing operation) to the mobile terminal 100, and the processing returns to step S504.

A case of "acquiring a printer log in the sleep state" will be described as an example.

When the CPU 306 receives a command for acquiring a printer log from the mobile terminal 100, the CPU 306 determines, based on the energization management table, that it is necessary to supply electric power to the near-field wireless communication unit 300, the controller unit 404, and the printer unit 405 to acquire the printer log. In step S506, when the CPU 306 determines that power supply to the near-field wireless communication unit 300 is necessary (YES in step S506), the processing proceeds to step S509.

In step S509, the CPU 306 instructs the device control unit 308 to switch the power supply source of the power supply switching unit 201 to the B input, and supply electric power generated by the near-field wireless unit power supply 202 from the AC input, to the near-field wireless communication unit 300.

In step S510, the CPU 306 determines, based on the command received from the mobile terminal 100 and the energization management table, whether power supply to the device unit 400 is necessary. As described above, in the case of the command for acquiring a printer log from the mobile terminal 100, the CPU 306 determines that it is necessary to supply electric power to the device unit 400 (in this example, the controller unit 404 and the printer unit 405). In step S510, when the CPU 306 determines that power supply to the device unit 400 is necessary (YES in step S510), the processing proceeds to step S511.

In step S511, the CPU 306 instructs the device control unit 308 to start the device described in the energization management table as a device to be started. In the case of "acquiring a printer log in the sleep state", the CPU 306 instructs the device control unit 308 to output the start signals 1 and 2 for starting the power supply units 401 and 402, respectively.

When the controller unit 404 is started, in step S512, the CPU 306 instructs the controller unit 404 to acquire the printer log. In response to the instruction, the controller unit 404 communicates with the printer unit 405, acquires the log of the operation (the printer log), and sends the acquired printer log to the CPU 306. When the processing in step S512 ends, in step S508, as a response to the received command, the CPU 306 sends the acquired data to the mobile terminal 100, and the processing returns to step S501.

Meanwhile, in step S510, when the CPU 306 determines that power supply to the device unit 400 is not necessary (NO in step S510), in step S508, the CPU 306 performs processing corresponding to the command, and sends the response to the command to the mobile terminal 100. Then, the processing returns to step S504.

Next, a case where "a return button is pressed in the sleep state" will be described. This case corresponds to a case where the MFP 200 returns from the sleep state by operating a sleep release button on an operation panel (not illustrated).

When the CPU 306 determines that a start factor of the CPU 306 is return from the sleep state ("RETURN FROM SLEEP MODE" in step S502), in a step (not illustrated), the CPU 306 records, in the work memory 309, a flag indicating that the MFP 200 has been started by the return button, and the processing proceeds to step S513. In step S513, the CPU 306 instructs the device control unit 308 to output the start signals 1, 2, and 3 for starting all power supplies (the power supply units 401, 402, and 403) of the device unit 400. Through this operation, the device unit 400 (the controller unit 404, the printer unit 405, and the reader unit 406) is started.

In step S513, the CPU 306 waits for a command from the mobile terminal 100. When the CPU 306 determines that a command from the mobile terminal 100 has been received ("RECEIVED" in step S513), in step S514, the CPU 306 performs processing corresponding to the command, and sends a response to the command to the mobile terminal 100. Then, the processing returns to step S513.

As described above, the second exemplary embodiment has described the configuration in which, in the sleep state, power supply from the near-field wireless unit power supply 202 to the near-field wireless communication unit 300 is stopped. Consequently, in addition to the effects according to the first exemplary embodiment, effects such as further reduction in power consumption can be achieved.

In the above-described exemplary embodiments, image forming apparatuses such as the MFP and the printer are referenced for exemplary purposes. Additional embodiments can also be applied to information processing apparatuses having a near-field wireless communication unit and being capable of acquiring information from the mobile terminal 100 or perform setting to the mobile terminal 100.

It is to be understood that the configurations and the contents of the above-described various types of data are not limited to those described in the above-described exemplary embodiments, and various configurations or contents may be provided depending on the usage or purposes.

While an exemplary embodiment has been described, additional exemplary embodiments can be implemented, for example, as a system, an apparatus, a method, a program, or a storage medium. Specifically, exemplary embodiments can be applied to a system including a plurality of devices or an apparatus consisting of a single device.

The present disclosure includes all configurations that can be implemented by combining the above-described exemplary embodiments.

An exemplary embodiment can be implemented by executing the following processing. That is, software (a program) for implementing the functions of the above-described exemplary embodiments is supplied to a system or apparatus via a network or various storage media. A computer (or a CPU or a micro processing unit (MPU)) of the system or apparatus reads and executes the program.

It is to be understood that the above exemplary embodiments are not limiting, so various modifications (including organic combinations of the exemplary embodiments) can be made based on the spirit of the present disclosure, and such modifications are not to be excluded from the scope of the present disclosure. That is, the present disclosure includes all configurations implemented by combining the above-described exemplary embodiments and their modifications.

According to an exemplary embodiment, when setting or acquiring information to or from an information processing apparatus using near-field wireless communication, the convenience of an operator and power saving capability can be enhanced by eliminating the need for operator's determination of whether to energize an apparatus body, and preventing unnecessary power consumption caused by unnecessary startup of the apparatus body due to mis-operation.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-260812 filed Dec. 18, 2013, which is hereby incorporated by reference herein in its entirety.

What is claimed is:

1. An information processing apparatus operable in a first power state and in a second power state in which power consumption is lower than that in the first power state, the information processing apparatus comprising:
   a near-field wireless communication unit which is driven by electric power induced by a radio wave from a mobile terminal and communicate with the mobile terminal when the information processing apparatus is in the second power state,
   wherein, in a case where a command received from the mobile terminal when the information processing apparatus is in the second power state is a command of a first type, the near-field wireless communication unit sends a response corresponding to the command to the mobile terminal in the second power state, using the electric power induced by the radio wave from the mobile terminal; and
   a power supply which, in a case where the command received from the mobile terminal when the information processing apparatus is in the second power state is a command of a second type, supplies electric power to a portion of the information processing apparatus necessary for sending a response corresponding to the command to the mobile terminal.

2. The information processing apparatus according to claim 1, wherein, in the first power state, the near-field wireless communication unit is driven by electric power based on an external power supply.

3. The information processing apparatus according to claim 1, wherein the near-field wireless communication unit stores a table in which each command to be received from the mobile terminal is associated with a portion of the information processing apparatus that is to be energized, and determines, based on information in the table and on the command received from the mobile terminal, the portion to be energized.

4. The information processing apparatus according to claim 1, wherein, in a case where the received command is a command of the first type, the near-field wireless communication unit reads information from a storage unit and sends a response using the read information.

5. The information processing apparatus according to claim 1, wherein, in a case where the received command is a command of the second type, the near-field wireless communication unit reads information from the portion to which electric power is supplied, and sends a response using the read information.

6. The information processing apparatus according to claim 1, wherein, in a case where information is unable to be read from the portion necessary for sending the response corresponding to the command to the mobile terminal, the near-field wireless communication unit notifies the mobile terminal that the information in unable to be read.

7. The information processing apparatus according to claim 1, further comprising an image forming unit configured to form an image on a sheet.

8. A method of controlling an information processing apparatus operable in a first power state and in a second power state in which power consumption is lower than that in the first power state, and having a near-field wireless communication unit that is driven by electric power induced by a radio wave from a mobile terminal and that communicates with the mobile terminal when the information processing apparatus is in the second power state, the method comprising:
- sending, in a case where a command received by the near-field wireless communication unit from the mobile terminal when the information processing apparatus is in the second power state is a command of a first type, a response corresponding to the command to the mobile terminal in the second power state, using the electric power induced by the radio wave from the mobile terminal; and
- supplying, at a power supply, in a case where the command received by the near-field wireless communication unit from the mobile terminal when the information processing apparatus is in the second power state is a command of a second type, electric power to a portion of the information processing apparatus necessary for sending a response corresponding to the command to the mobile terminal.

9. A non-transitory computer-readable storage medium storing computer executable instructions for causing a computer to execute a method to control an information processing apparatus operable in a first power state and in a second power state in which power consumption is lower than that in the first power state and having a near-field wireless communication unit that is driven by electric power induced by a radio wave from a mobile terminal and that communicates with the mobile terminal when the information processing apparatus is in the second power state, the method comprising:
- sending, in a case where a command received by the near-field wireless communication unit from the mobile terminal when the information processing apparatus is in the second power state is a command of a first type, a response corresponding to the command to the mobile terminal in the second power state, using the electric power induced by the radio wave from the mobile terminal; and
- supplying, at a power supply, in a case where the command received by the near-field wireless communication unit from the mobile terminal when the information processing apparatus is in the second power state is a command of a second type, electric power to a portion of the information processing apparatus necessary for sending a response corresponding to the command to the mobile terminal.

* * * * *